US005711207A

United States Patent [19]
Wu

[11] Patent Number: 5,711,207
[45] Date of Patent: Jan. 27, 1998

[54] TEA MAKING DEVICE

[75] Inventor: Tsan-Kuen Wu, Tainan Hsien, Taiwan

[73] Assignee: Tsann Kuen USA Inc.

[21] Appl. No.: 739,415

[22] Filed: Oct. 29, 1996

[51] Int. Cl.⁶ ............................................. A47J 37/00
[52] U.S. Cl. ............................................. 99/307; 99/304
[58] Field of Search ........................... 99/307, 304, 300, 99/323.3

[56] References Cited

U.S. PATENT DOCUMENTS

| | | | |
|---|---|---|---|
| 5,063,838 | 11/1991 | Matuschek | 99/307 |
| 5,219,394 | 6/1993 | Simmons | 99/307 X |
| 5,231,918 | 8/1993 | Grzywna | 99/307 X |

Primary Examiner—Reginald L. Alexander
Attorney, Agent, or Firm—Burns, Doane, Swecker & Mathis

[57] ABSTRACT

A tea making device includes a hollow main body, a tea brewing unit, a pitcher and a hollow base unit. The main body has an upper portion formed with a water receiving chamber, and a lower portion formed with an accommodation chamber that is isolated from the water receiving chamber. The accommodation chamber is provided with a guiding tube that has a water inlet communicated with the water receiving chamber and a water outlet, and a heating device for heating water that passes through the guiding tube. The tea brewing unit is disposed on one side of the main body, has a brewing chamber communicated with the water outlet, and is formed with a tea outlet. The pitcher is to be disposed below the tea outlet and is capable of receiving the brewed tea that is released from the tea outlet. The base unit has an upper portion on which the main body is mounted removably, and a bottom portion with an open end through which the main body and the tea brewing unit are capable of being received when the main body is removed from the base unit. The pitcher confines a space sufficient for receiving all other components of the tea making device therein after the main body and the tea brewing unit are received in the base unit for storage purposes.

17 Claims, 10 Drawing Sheets

TEA MAKING DEVICE

BACKGROUND OF THE INVENTION

1. Field of the Invention

The invention relates to a tea making device, more particularly to a tea making device that comprises separable components and that occupies a relatively small storage or packing space.

2. Description of the Related Art

Referring to FIG. 1, a conventional tea making device (D) is shown to include a main body 1, a pitcher 2 and a brewing member 3. The main body 1 includes a hollow cylindrical body 10 having an outer side with an indented portion 11. The cylindrical body 10 has an upper water receiving chamber 13 and a lower heating chamber provided with a heating device 12. The water receiving chamber 13 has a bottom end formed with a first water outlet 15 communicated with a guiding tube 16 that is heated by the heating device 12. The main body 1 has a top end portion formed with a second water outlet 14. The water receiving chamber 13 is further provided with a communicating tube 17 which communicates the guiding tube 16 with the second water outlet 14. The pitcher 2 has an open top end and a tea receiving chamber 20. The brewing member 3 is to be disposed on the open top end of the pitcher 2 and has a brewing chamber 30. The heated water that flows out of the second water outlet 14 is received in the brewing chamber 30 of the brewing member 3. The brewing member 3 has a surrounding wall formed with tea outlets 31 for releasing brewed tea into the tea receiving chamber 20 of the pitcher 2.

To use the conventional tea making device (D), tea leaves are placed within the brewing chamber 30 of the brewing member 3. The pitcher 2 is then brought to a position adjacent to the indented portion 11 and below the second water outlet 14 of the main body 1. Water is then added into the water receiving chamber 13 such that the water flows through the guiding tube 16 and is heated by the heating device 12. The heated water then flows through the communicating tube 17 and the second water outlet 14 and into the brewing chamber 30 of the brewing member 3. The brewed tea is then released from the tea outlets 31 and into the tea receiving chamber 20 of the pitcher 2. Additives, such as ice cubes, may be added into the brewed tea that is received in the pitcher 2.

As shown in FIG. 2, when the conventional tea making device (D) is not in use and is to be packed or stored, the pitcher 2 is inverted and is capped on the main body 1 such that the main body 1 is received in the tea receiving chamber 20 of the pitcher 2. In this situation, the brewing member 3, which cannot be received in the tea receiving chamber 20 of the pitcher 2, occupies additional space. The conventional tea making device (D) thus occupies a relatively large amount of space during storage and packing, thereby resulting in increased transport costs.

SUMMARY OF THE INVENTION

Therefore, the main object of this invention is to provide a tea making device that includes separable components and that occupies a relatively small storage or packing space.

Accordingly, the tea making device of the present invention includes a hollow main body, a tea brewing unit, a pitcher and a hollow base unit. The hollow main body has an upper portion formed with a water receiving chamber and a lower portion formed with an accommodation chamber that is isolated from the water receiving chamber. The accommodation chamber is provided with a guiding tube that has a water inlet communicated with the water receiving chamber and a water outlet. The accommodation chamber is further provided with a heating device for heating water that passes through the guiding tube. The tea brewing unit is disposed on one side of the water receiving chamber of the main body and has a brewing chamber for receiving tea leaves therein. The brewing chamber is communicated with the water outlet of the guiding tube and is formed with a tea outlet for releasing brewed tea from the brewing chamber. The pitcher is to be disposed below the tea outlet of the tea brewing unit and is capable of receiving the brewed tea that is released from the tea outlet of the tea brewing unit. The hollow base unit has an upper portion and a bottom portion with an open end. The lower portion of the main body is mounted removably on the upper portion of the base unit. The main body and the tea brewing unit are capable of being received in the bottom portion of the base unit via the open end when the main body is removed from the base unit. The pitcher confines a space sufficient for receiving the base unit, the tea brewing unit and the main body therein after the main body and the tea brewing unit are received in the base unit for storage purposes.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
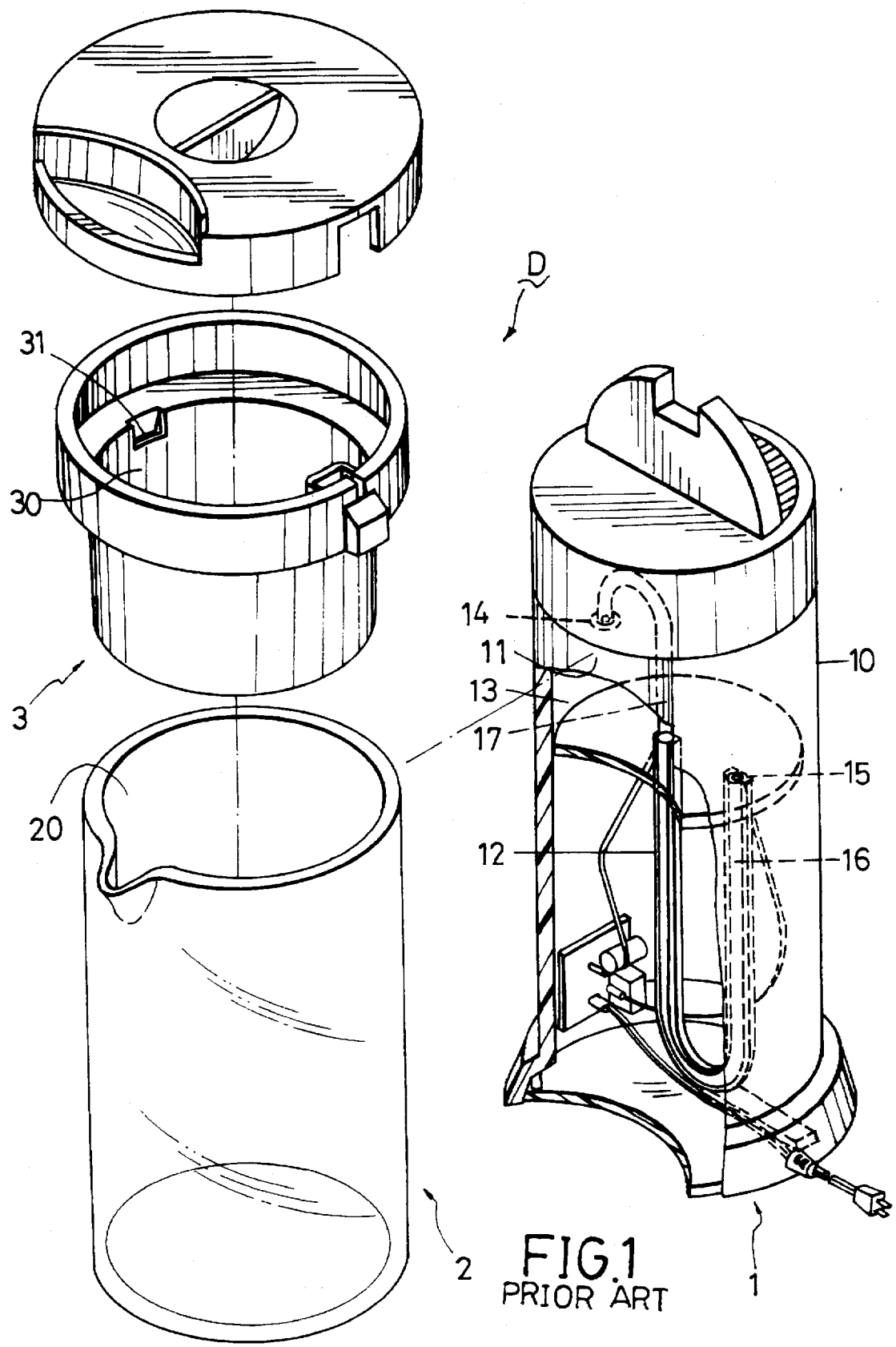
FIG. 1 is a partially sectional exploded perspective view of a conventional tea making device.
Figure 2:
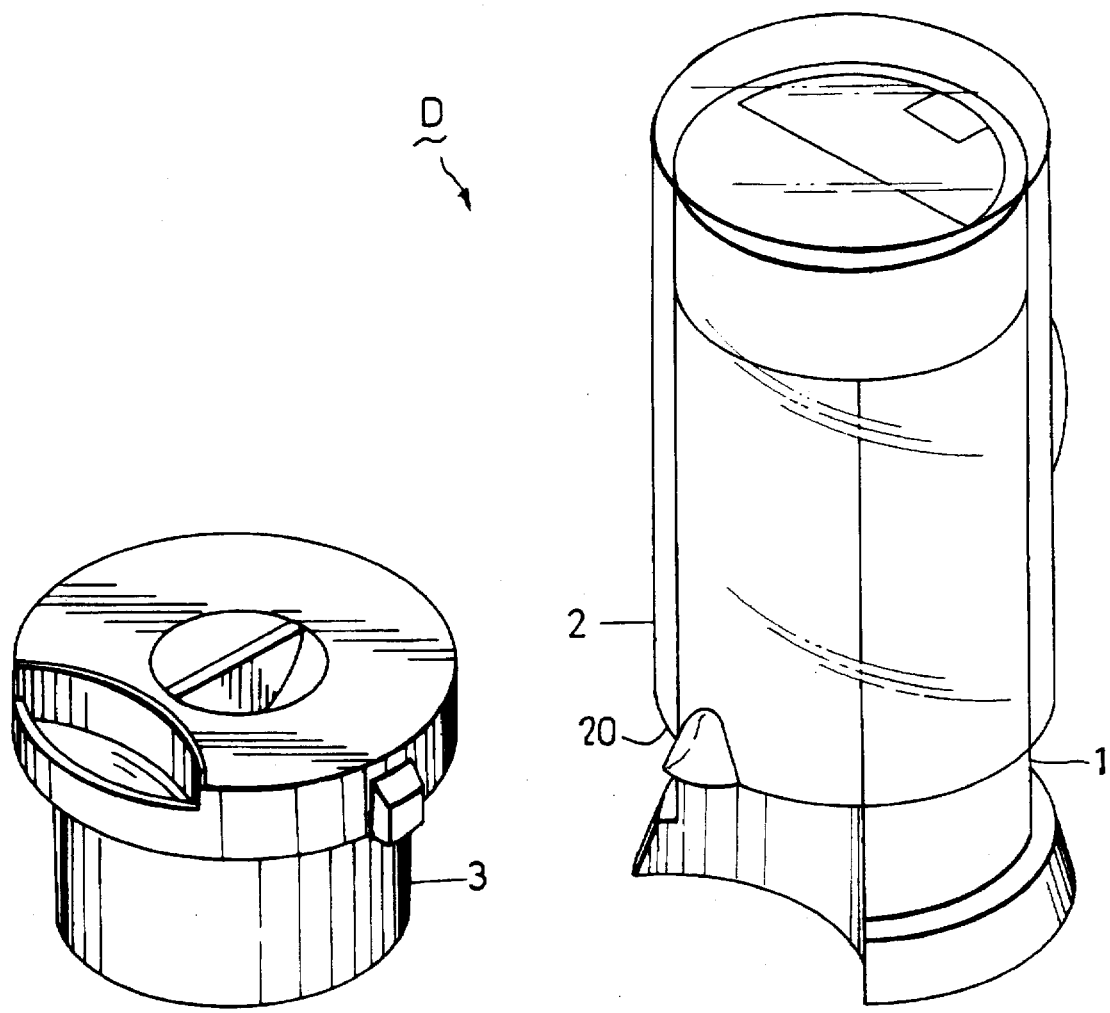
FIG. 2 illustrates how a main body is received in a pitcher of the conventional tea making device shown in FIG. 1 for storage purposes.
Figure 3:
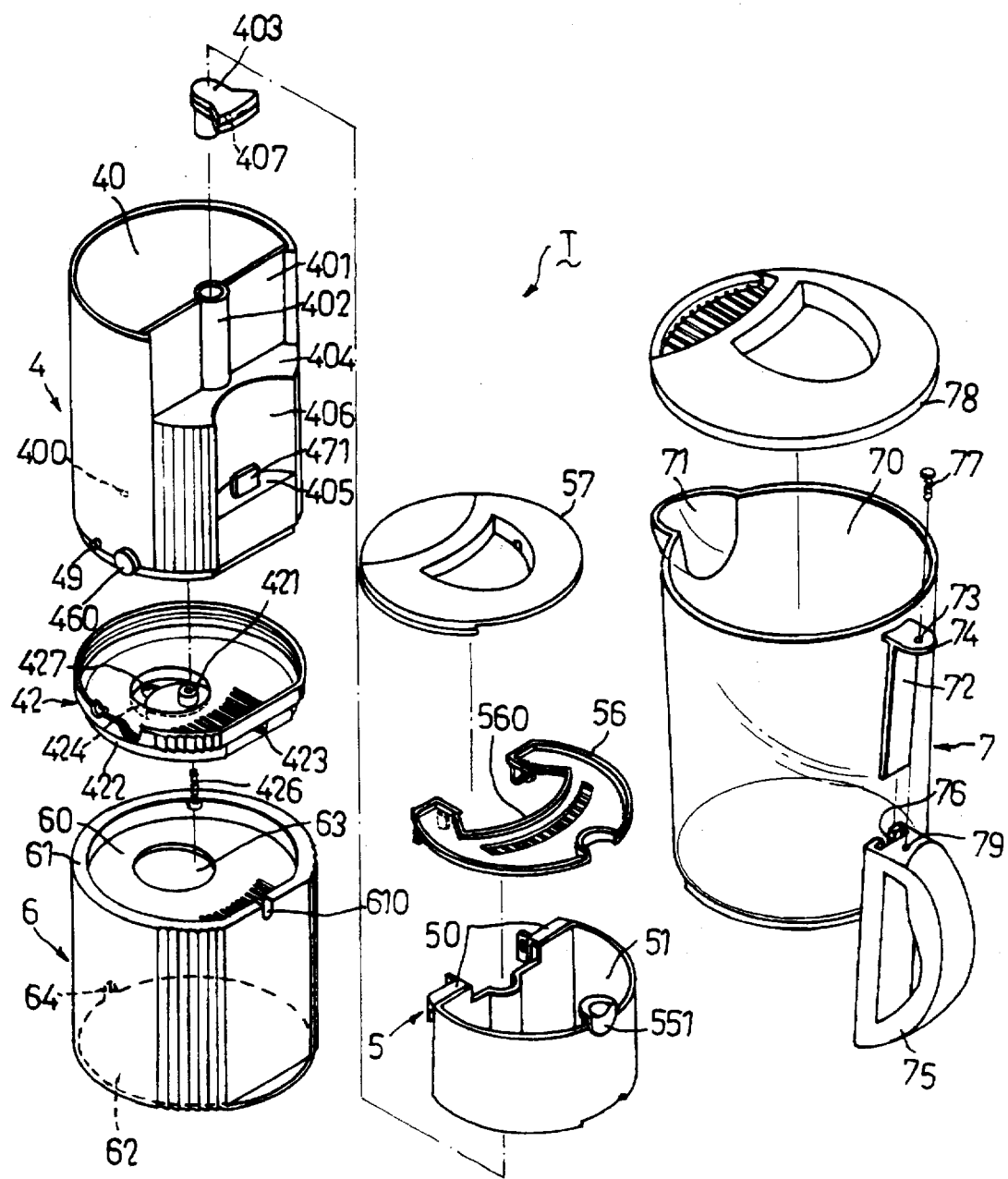
FIG. 3 is an exploded perspective view of the tea making device according to a first preferred embodiment of the present invention.
Figure 4:
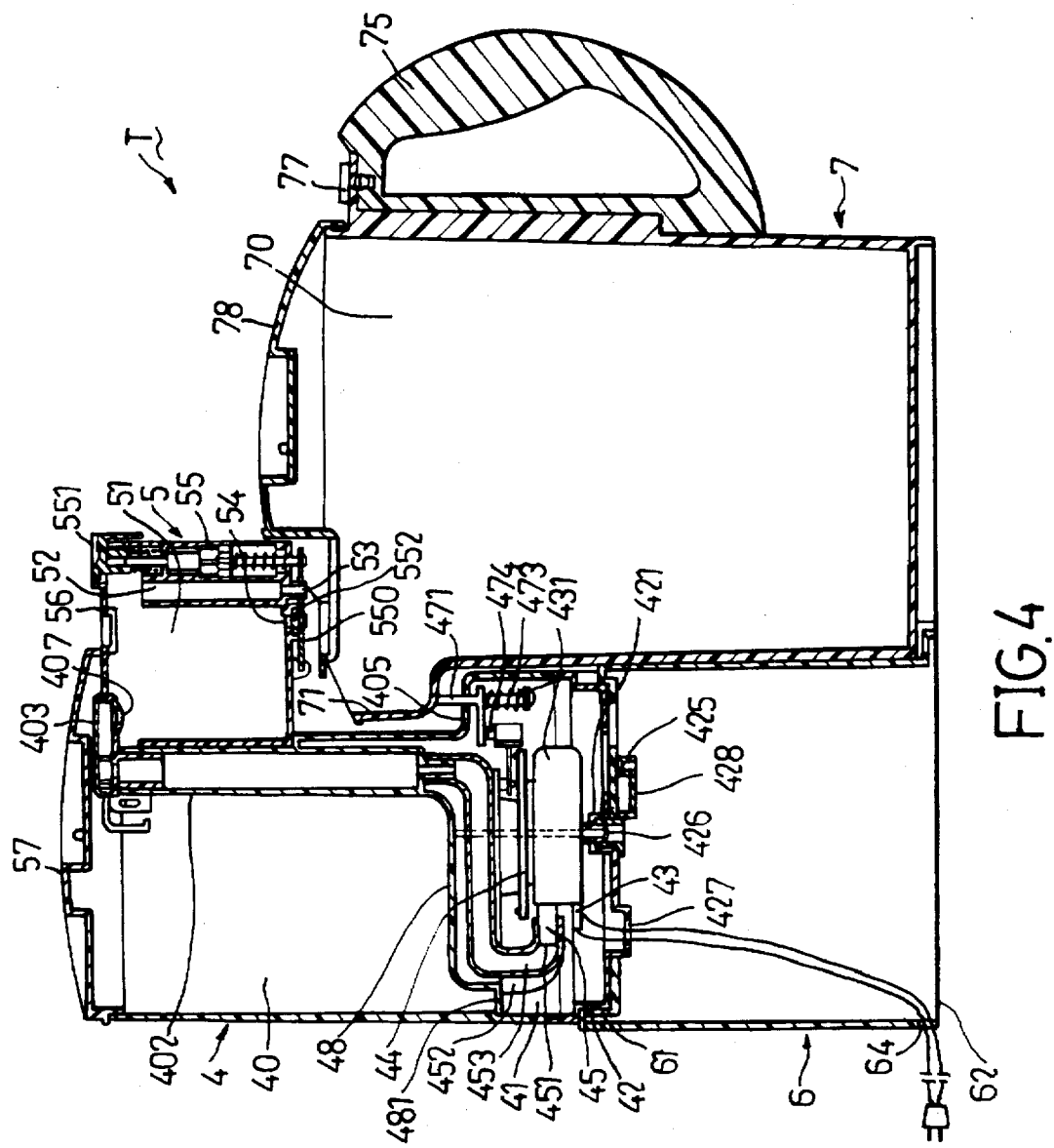
FIG. 4 is a vertical section of the tea making device shown in FIG. 3.

Referring to FIGS. 3 and 4, the tea making device (T) according to a first preferred embodiment of the present invention is shown to include a main body 4, a tea brewing unit 5, a base unit 6 and a pitcher 7.

The main body 4 has an upper portion formed with a water receiving chamber 40 that has an open top end, a lower portion formed with an accommodation chamber 41 that has an open bottom end, and a partition wall 48 which isolates the water receiving chamber 40 from the accommodation chamber 41. The main body 4 is provided with a first removable cover 57 for covering the open top end of the water receiving chamber 40. The water receiving chamber 40 has one side formed with a vertical wall 401. The main body 4 is further provided with an upright communicating tube 402 on the vertical wall 401, and a tubular extension 403 that has a first end mounted removably and rotatably on a top end of the communicating tube 402. The upper portion of the main body 4 has one side formed with an upper flat portion 404 which extends horizontally and outwardly from the vertical wall 401 and which has an indented outer face. The tea brewing unit 5 is disposed adjacent to the vertical wall 401 and is supported on the upper flat portion 404. The tea brewing unit 5 is formed with rearwardly extending hook members 50 for engaging the vertical wall 401 to hang the tea brewing unit 5 removably on one side of the water receiving chamber 40. The detailed structure of the tea brewing unit 5 will be described later. The main body 4 is further formed with a vertically extending curved wall 406 which defines the indented outer face of the upper flat portion 404. The lower portion of the main body 4 is further formed with a lower flat portion 405 that is parallel to the upper flat portion 404 and that extends from the curved wall 406.

Figure 6:
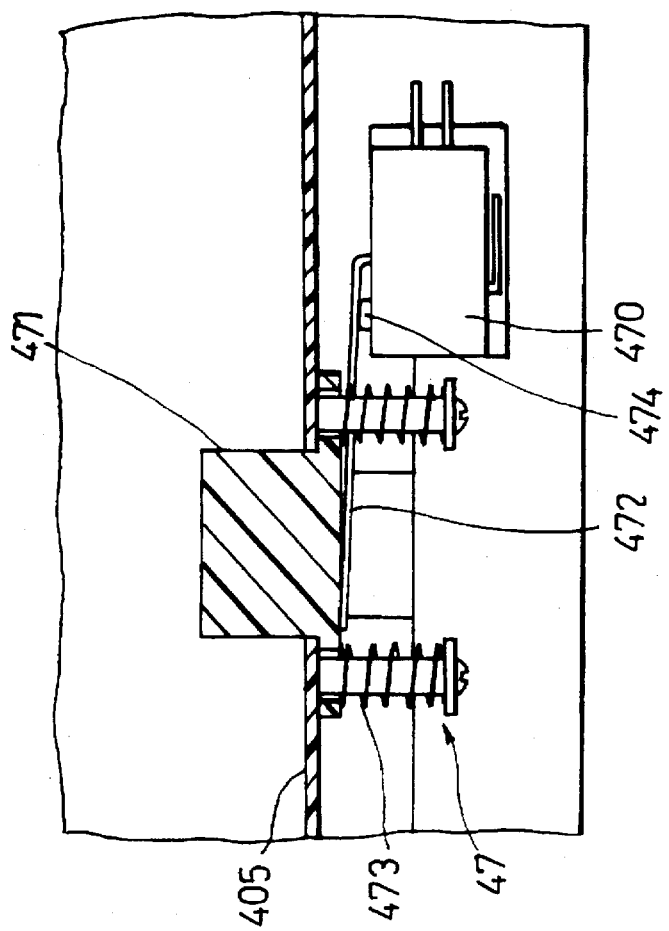
FIG. 6 is a vertical section illustrating a safety switch of the tea making device shown in FIG. 3.
Figure 5:
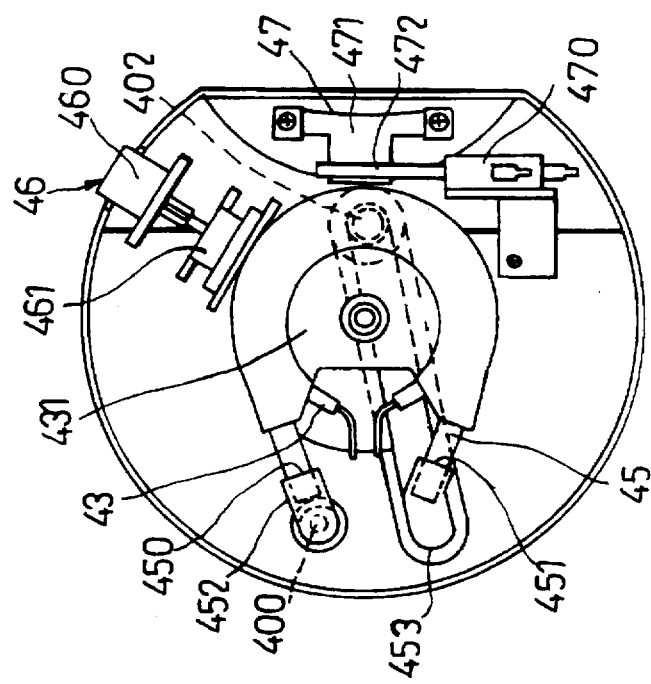
FIG. 5 illustrates how the heating device heats the water that passes through the guiding tube of the tea making device shown in FIG. 3.
Figure 7:
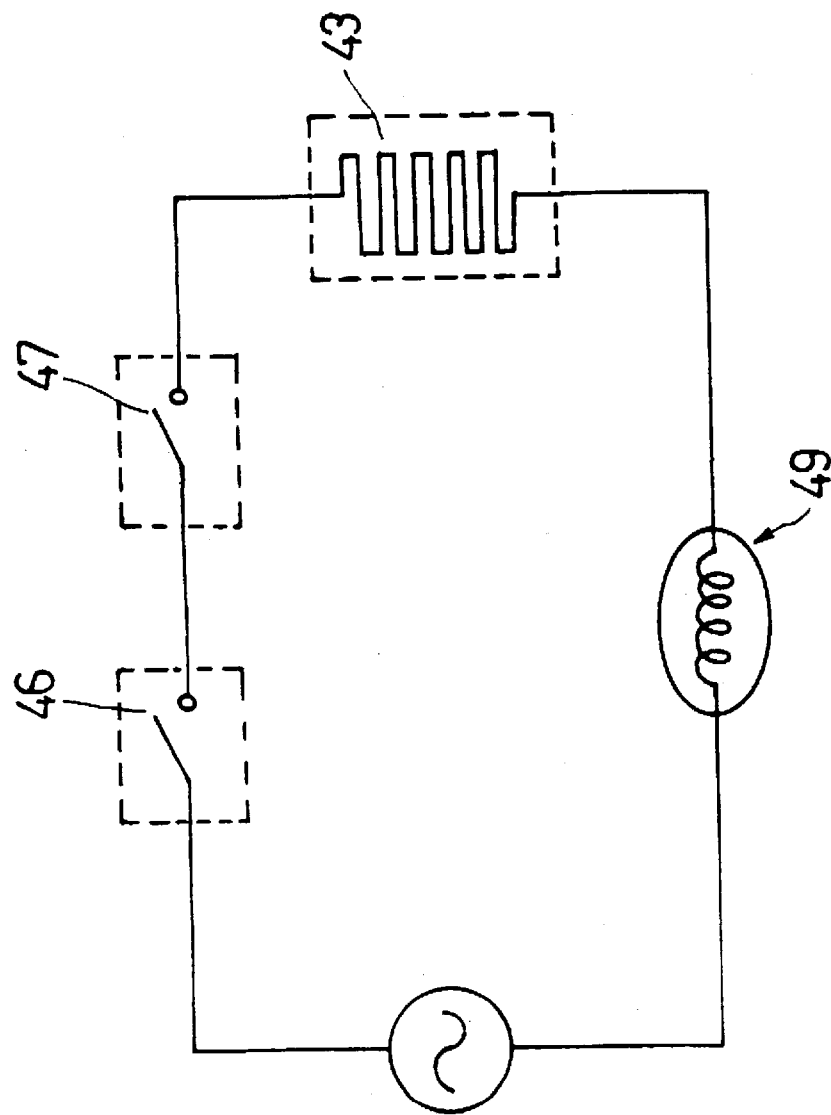
FIG. 7 is an electric circuit diagram illustrating the electrical connection of a power source and the heating device shown in FIG. 3.

As shown in FIGS. 4 and 5, the accommodation chamber 41 is provided with a heating device 43 having a C-shaped structure and a guiding tube 45 disposed above the heating device 43. The heating device 43 and the guiding tube 45 are enveloped within a hollow metal block 431. The accommodation chamber 41 is further provided with a heat insulating board 44 above the metal block 431. The partition wall 48 includes a lower portion 481 with a communicating hole 400 formed therethrough. The guiding tube 45 has a water inlet 450 communicated with the communicating hole 400 by means of a first pipe member 452, and a water outlet 451 communicated with a bottom end of the communicating tube 402 by means of a second pipe member 453. The lower portion of the main body 4 is provided with a power switch unit 46 that is adapted to connect electrically the heating device 43 to a power source. The power switch unit 46 includes a manual switch 460 on an outer side of the lower portion of the main body 4 and a known temperature control switch 461 which disconnects the heating unit 43 from the power source when the temperature of the heating device 43 exceeds a predetermined value. The tea making device (T) further includes a safety switch 47 which is connected electrically to the heating device 43 and the power switch unit 46. As shown in FIG. 6, the safety switch 47 includes a micro switch 470 connected electrically to the heating device 43, a pressing block 471 having an L-shaped cross-section, and a bar member 472 below the pressing block 471. The safety switch 47 is provided with spring members 473 which bias the pressing block 471 upwardly such that a vertical portion of the pressing block 471 extends out of the lower flat portion 405 of the main body 4. When the pressing block 471 is pressed downwardly, the bar member 472 is moved downwardly to activate a switch contact 474 on the micro switch 470 so as to connect electrically the micro switch 470 to the heating device 43 and the power source. As shown in FIG. 3, the tea making device (T) further includes a light indicator 49 that is mounted on the lower portion of the main body 4 and that is connected electrically to the power switch unit 46 and the power source. An electric circuit diagram illustrating the electrical connection between the heating device 43, the power source, the power switch unit 46, the safety switch 47 and the light indicator 49 is shown in FIG. 7.

Referring again to FIG. 3, the lower portion of the main body 4 is provided with a dish member 42 for covering the bottom end of the main body 4. The dish member 42 has a restricted bottom section 422 that has a bottom side provided with a circular protrusion 424. The circular protrusion 424 is provided a wire passage hole 427 and has a hollow vertical column 421 formed therethrough. The hollow base unit 6 has an upper portion that is formed with a retaining cavity 60 and that has a base wall formed with a circular opening 63. The restricted bottom section 422 of the dish member 42 is received in the retaining cavity 60 with the circular protrusion 424 extending into the circular opening 63. The dish member 4 has an edge portion formed with a key protrusion 423. The upper portion of the base unit 6 has a surrounding wall 61 that confines the retaining chamber 60 and that has an upper edge formed with a first notch 610. The key protrusion 423 of the dish member 42 extends into the first notch 610 of the base unit 6 to engage removably the base unit 6.

Figure 8A:
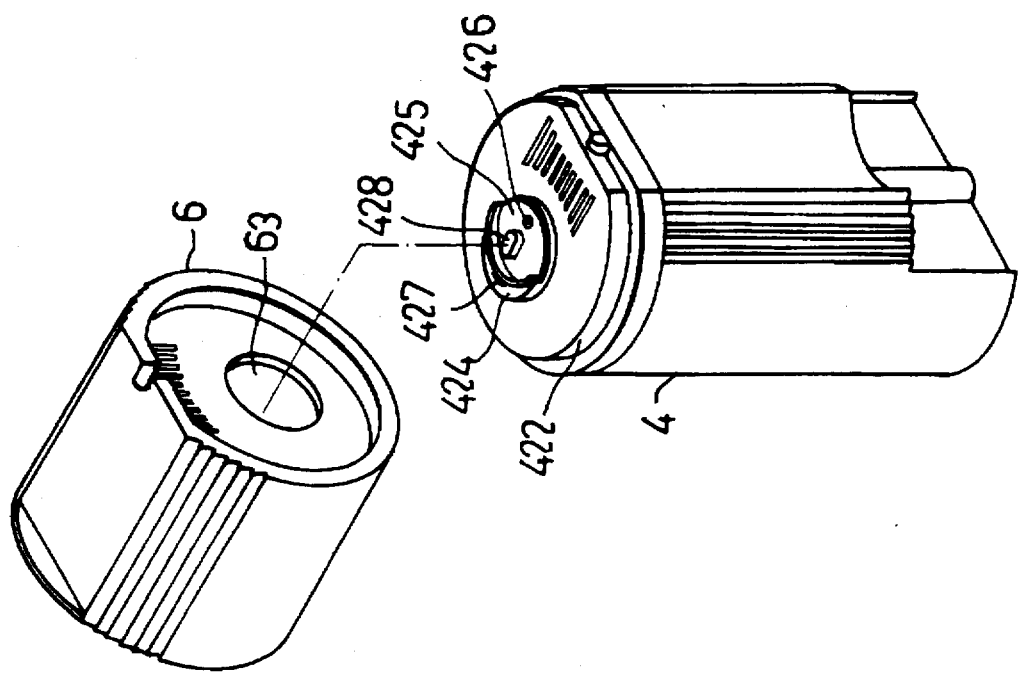
FIG. 8 and 8A are bottom views illustrating how a dish member is retained on the base unit by an engaging plate so as to mount removably the main body on the base unit of the tea making device shown in FIG. 3.
Figure 8:
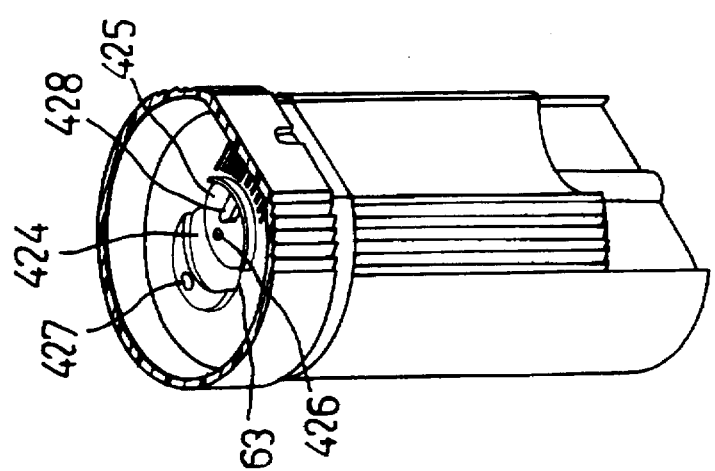

As shown in FIGS. 8 and 8A, the main body 4 is further provided with an engaging plate 425 that is formed with an operating projection 428. The engaging plate 425 is mounted rotatably on the circular protrusion 424 on the bottom side of the restricted bottom section 422 by means of a fastener, such as a bolt 426. The engaging plate 425 is thus spaced from the bottom side of the restricted bottom section 422 of the dish member 42. The engaging plate 425 is capable of rotating about a vertical axis of the bolt 426 from a first position, in which the engaging plate 425 is permitted to pass through the circular opening 63 in the base wall of the base unit 6, as shown in FIG. 8A, to a second position in which a portion of a periphery defining the opening 63 in the base wall extends into a space formed between the engaging plate 425 and the dish member 42 so as to retain the dish member 42 on the base wall, as shown in FIG. 8. As shown in FIG. 4, the bolt 426 extends through the engaging plate 425, the hollow vertical column 421, a middle portion of the heating device 43 and the heat insulating board 44 to engage the partition wall 48 of the main body 4 and to mount the dish member 42 and the base unit 6 securely on the main body 4.

Figure 11:
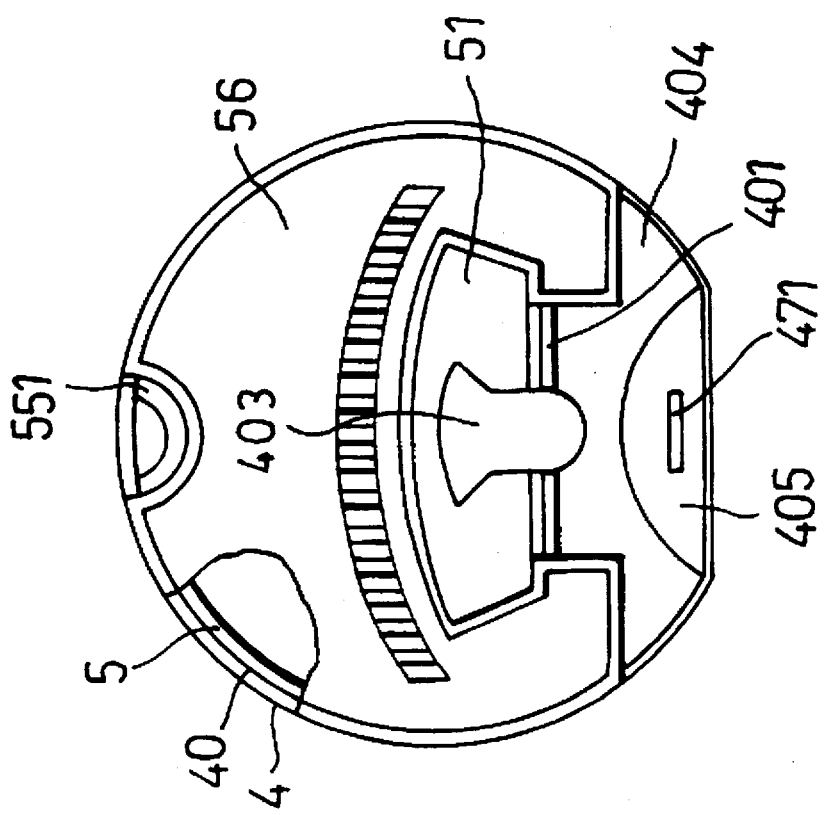
FIG. 11 illustrates how the tea brewing unit is received in the water receiving chamber of the main body of the tea making device shown in FIG. 3 when the tea making device is not in use.

Referring again to FIGS. 3 and 4, the tea brewing unit 5 has a brewing chamber 51 for receiving tea leaves therein. The tubular extension 403 that is mounted on the top end of the communicating tube 402 of the main body 4 has a second end 407 extending toward the brewing chamber 51 to communicate the communicating tube 402 and the brewing chamber 51. The tea brewing unit 5 is further provided with an upright hollow tube 52. The upright hollow tube 52 has a top end lower than a topmost level of the brewing chamber 51, and a bottom end formed with a tea outlet 53 for releasing brewed tea from the brewing chamber 51. The brewing chamber 51 has a bottom side formed with a drain hole 54. The tea brewing unit 5 is further provided with drain means 55 which includes a horizontal board 550 and a vertical spring-loaded operating member 551. The horizontal board 550 has one end pivoted to a bottom surface of the tea brewing unit 5 and another end connected to a bottom end of the operating member 551. The horizontal board 550 is provided with a plug member 552 that plugs the drain hole 54 to prevent the brewed tea from flowing out via the drain hole 54. When the top end of the operating member 551 is pressed downwardly to tilt the horizontal board 550, the plug member 552 is removed from the drain hole 54, thereby releasing the residual brewed tea in the brewing chamber 51. The tea brewing unit 5 further includes a dust protecting cap 56 having an edge pivoted to the hook members 50. The dust protecting cap 56 has an indented portion 560 for accommodating the tubular extension 403 mounted on the top end of the communicating tube 402. As shown in FIG. 11, the water receiving chamber 40 of the main body 4 has a size sufficient for receiving the tea brewing unit 5 therein when the tea brewing unit 5 is removed from the vertical wall 401. The hook members 50 are also capable of being hung on the vertical wall 401 when the tea brewing unit 5 is received in the water receiving chamber 40.

Referring back to FIGS. 3 and 4, the hollow base unit 6, as previously described, is disposed below and is mounted removably on the lower portion of the main body 4. The base unit 6 has a bottom portion with an open end 62. The main body 4 and the tea brewing unit 5 are capable of being received in the bottom portion of the base unit 6 via the open end 62 when the main body 4 is removed from the base unit 6. The open end 62 has an edge formed with a second notch 64 for passage of electric wires.

The pitcher 7 is to be disposed below the tea brewing unit 5 and is capable of receiving the brewed tea that is released from the tea outlet 53 of the tea brewing unit 5. The pitcher 7 confines a space 70 sufficient for receiving the base unit 6, the tea brewing unit 5 and the main body 4 therein after the main body 4 and the tea brewing unit 5 are received in the base unit 6 for storage purposes. The pitcher 7 is formed with a protruding lip 71 which has a bottom side capable of pressing the pressing block 471 of the safety switch 47 to activate the safety switch 47 when the pitcher 7 is disposed at a position below the tea brewing unit 5 and when the protruding lip 71 extends toward the curved wall 406 for receiving the brewed tea released from the tea outlet 53 of the brewing chamber 51. The pitcher 7 has an outer surface provided with a vertically extending tongue member 72. The tongue member 72 is diametrically opposite to the protruding lip 71 and has a top end portion provided with a horizontal extension 74 that is formed with a through hole 73. The tea making device (T) is further provided with a handle member 75 that has a rear side formed with a vertical dovetail groove 76 with an open top end. The handle member 75 has a top end portion formed with a mounting hole 79 that is aligned with the through hole 73. The handle member 75 is capable of moving slidably and upwardly towards the tongue member 72 such that the tongue member 72 extends into the dovetail groove 76 and such that the top end portion of the handle member 75 abuts against the horizontal extension 74 of the tongue member 72 so as to mount the handle member 75 on the pitcher 7. A screw fastener 77 extends through the through hole 73 in the horizontal extension 74 of the tongue member 72 and is received in and engages the mounting hole 79 to fasten the handle member 75 onto the tongue member 72 of the pitcher 7. The pitcher 7 has an open top end and is further provided with a second removable cover 78 for covering the open top end thereof.

Figure 9:
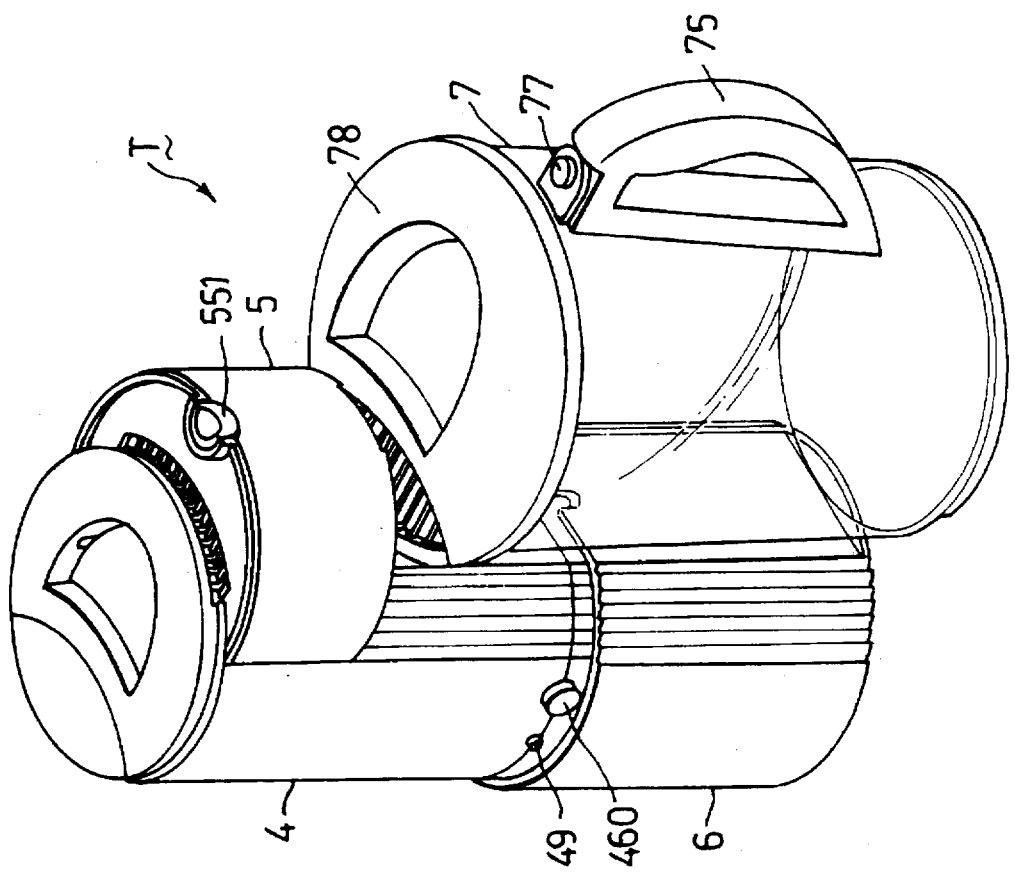
FIG. 9 is a perspective view illustrating the tea making device shown in FIG. 3 when in use.

To assemble the tea making device (T) for use, the hook members 50 of the tea brewing unit 5 are hung on the vertical wall 401, and the brewing unit 5 is supported on the upper flat portion 404. The restricted bottom section 422 of the dish member 42 is subsequently received in the retaining cavity 60 in the upper portion of the base unit 6 with the circular protrusion 424 of the dish member 42 and the engaging plate 425 passing through the circular opening 63 in the base wall of the upper portion of the base unit 6. The operating projection 428 is pushed along a horizontal direction to rotate the engaging plate 425 about the bolt 426 from the first position to the second position so as to retain the dish member 42 on the base wall of the base unit 6 and so as to mount removably the main body 4 on the base unit 6, as shown in FIGS. 8 and 8A. The main body 4, together with the tea brewing unit 5 disposed at one side thereof, are thereby located at a higher position. The tea outlet 53 of the tea brewing unit 5 is also at a position that would be higher than the protruding lip 71 of the pitcher 7, as shown in FIG. 9.

To use the tea making device (T) of the present invention, water is added into the water receiving chamber 40 and the manual switch 461 is turned on. The pitcher 7 is then brought toward the curved wall 406 to a position below the tea outlet 53 such that the bottom side of the protruding lip 71 activates the safety switch 47. In this situation, the light indicator 49 is turned on and the heating device 43 is activated, thereby heating the water that passes through the guiding tube 45. The heated water then passes through the communicating tube 402 and the tubular extension 403 and is guided into the brewing chamber 51 of the tea brewing unit 5 when the temperature of the heated water reaches a predetermined value. When liquid level in the brewing chamber 51 is higher than the top end of the upright hollow tube 52, the brewed tea flows through the tea outlet 53 at the bottom end of the hollow tube 52 and is released into the pitcher 7. When the remaining tea in the brewing chamber 51 is to be completely released, the vertical pressing member 551 of the drain means 55 is operated to tilt the horizontal bar 550 and remove the plug member 522 from the drain hole 54.

Figure 10:
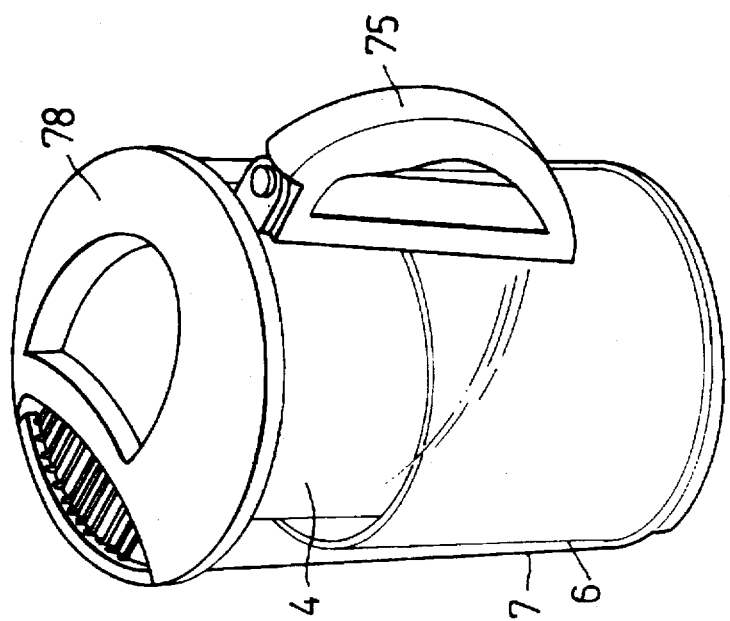
FIG. 10 illustrates how the main body, the tea brewing unit and the base unit are received in the pitcher of the tea making device shown in FIG. 3 for storage purposes.

When the tea making device (T) is to be stored or packed, the tea brewing unit 5 is received in the water receiving chamber 40 with the dust protecting cap 56 capped on the tea brewing unit 5. The engaging plate 425 is rotated back to the first position so as to remove the main body 4 from the base unit 6. The base unit 6 is then inverted such that the main body 4 and the tea brewing unit 5, which has been received in the water receiving chamber 40 of the main body 4, can be received in the bottom portion of the base unit 6 via the open end 62. Then, the base unit 6, together with the main body 4 and the tea brewing unit 5, is received in the space 70 of the pitcher 7, as shown in FIG. 10. The first and second removable covers 57 and 78 are then capped respectively on top of the main body 4 and the pitcher 7.

Figure 12:
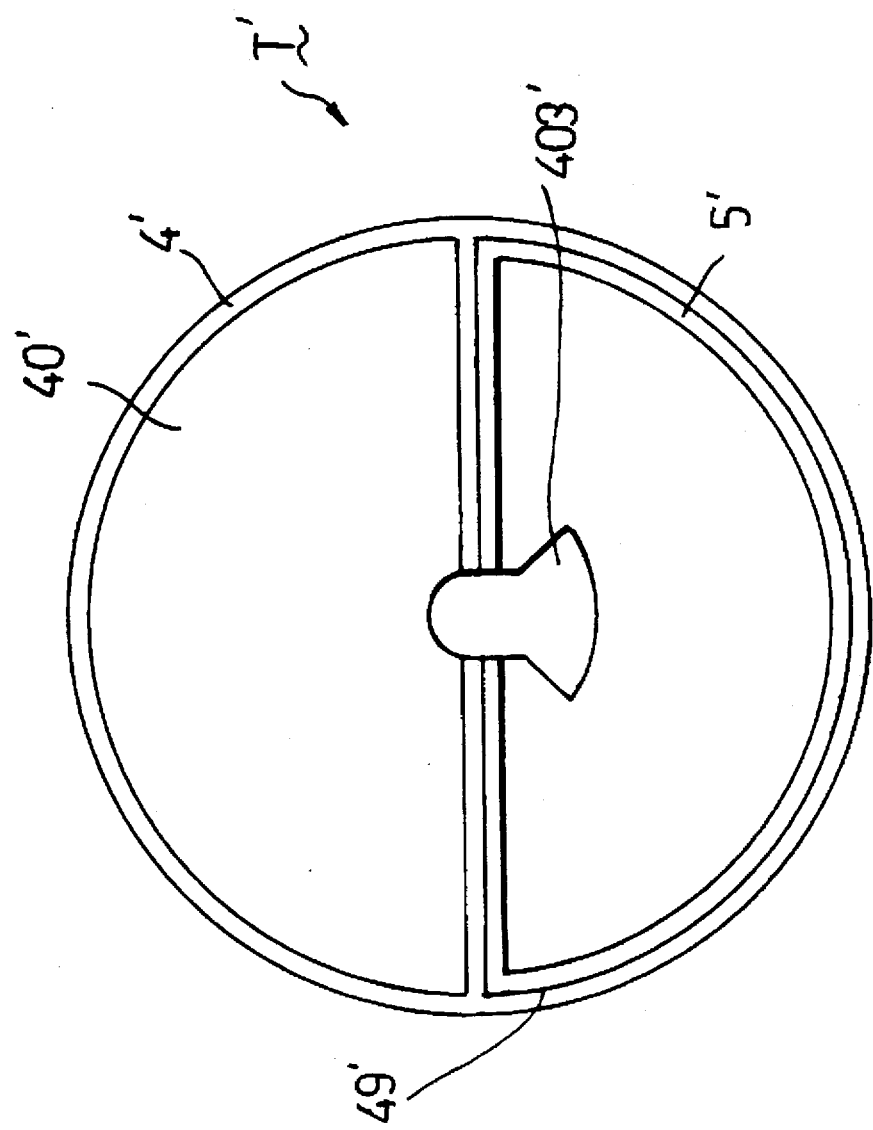
FIG. 12 is a top view of the main body and the tea brewing unit of the tea making device according to a second preferred embodiment of the present invention.

In a tea making device (T') according to a second preferred embodiment of the present invention, as shown in FIG. 12, the upper portion of the main body 4' has a circular cross-section and is formed with a water receiving chamber 40' and a retaining chamber 49' on one side of the water receiving chamber 40'. The retaining chamber 49' has a bottom end formed with an opening for exposing the tea outlet and the drain hole of the tea brewing unit 5'. The tea brewing unit 5' is capable of being received in the retaining chamber 49' as well as being received in the water receiving chamber 40'. The main body 4' and the tea brewing unit 5' that is received in retaining chamber 49' or in the water receiving chamber 40' have a combined size smaller than the space of the pitcher. In this situation, the tea brewing unit 5' can be placed in the retaining chamber 49' whether the tea making device is in use or is to be stored.

Since the main body, the tea brewing unit and the base unit can be received in the pitcher altogether, and since the handle member 75 is removable from the pitcher 7, the tea making device according to the present invention occupies a relatively small amount of storage or packing space. The packing and transport costs are therefore significantly reduced.

With this invention thus explained, it is apparent that numerous modifications and variations can be made without departing from the scope and spirit of this invention. It is therefore intended that this invention be limited only as indicated in the appended claims.

I claim:

1. A tea making device comprising:

a hollow main body having an upper portion formed with a water receiving chamber and a lower portion formed with an accommodation chamber that is isolated from said water receiving chamber, said accommodation chamber being provided with a guiding tube that has a water inlet communicated with said water receiving chamber and a water outlet, said accommodation chamber being further provided with a heating device for heating water that passes through said guiding tube;

a tea brewing unit disposed on one side of said water receiving chamber of said main body and having a brewing chamber for receiving tea leaves therein, said brewing chamber being communicated with said water outlet of said guiding tube and being formed with a tea outlet for releasing brewed tea from said brewing chamber;

a pitcher to be disposed below said tea outlet of said tea brewing unit and capable of receiving the brewed tea that is released from said tea outlet of said tea brewing unit; and a hollow base unit having an upper portion and a bottom portion with an open end;

said lower portion of said main body being mounted removably on said upper portion of said base unit, said main body and said tea brewing unit being capable of being received in said bottom portion of said base unit via said open end when said main body is removed from said base unit, said pitcher confining a space sufficient for receiving said base unit, said tea brewing unit and said main body therein after said main body and said tea brewing unit are received in said base unit for storage purposes.

2. The tea making device according to claim 1, wherein said main body is further provided with an upright communicating tube that has a bottom end connected to said water outlet of said guiding tube and a top end communicated with said brewing chamber.

3. The tea making device according to claim 2, wherein said main body further comprises a tubular extension that has a first end connected to said top end of said communicating tube and a second end extending toward said brewing chamber to communicate said communicating tube and said brewing chamber.

4. The tea making device according to claim 1, wherein said tea brewing unit is formed with rearwardly extending hook members for engaging one side of said water receiving chamber of said main body so as to hang removably said tea brewing unit on said main body.

5. The tea making device according to claim 1, wherein said water receiving chamber has a size sufficient for receiving said tea brewing unit therein.

6. The tea making device according to claim 1, wherein said lower portion of said main body is provided with a dish member for covering said accommodation chamber, said dish member having a restricted bottom section, said upper portion of said base unit being formed with a retaining cavity, said restricted bottom section of said dish member being received in said retaining cavity.

7. The tea making device according to claim 6, wherein said upper portion of said base unit has a base wall formed with an opening, said main body being further provided with an engaging plate that is mounted rotatably on and spacedly from a bottom side of said restricted bottom section of said dish member, said engaging plate being capable of rotating about a vertical axis relative to said dish member from a first position, in which said engaging plate is permitted to pass through said opening in said base wall, to a second position in which a portion of a periphery defining said opening in said base plate extends into a space formed between said engaging plate and said dish member so as to retain said dish member on said base wall.

8. The tea making device according to claim 6, wherein said dish member is formed with a key protrusion, said retaining cavity in said upper portion of said base unit being confined by a surrounding wall that has an upper edge formed with a notch, said key protrusion extending into said notch to engage removably said base unit.

9. The tea making device according to claim 1, wherein said lower portion of said main body is provided with a power switch unit that is adapted to connect electrically said heating device to a power source.

10. The tea making device according to claim 9, wherein said power switch unit comprises a manual switch on an outer side of said lower portion of said main body.

11. The tea making device according to claim 10, wherein said power switch unit further comprises a temperature control switch which disconnects said heating unit from the power source when temperature of said heating device exceeds a predetermined value.

12. The tea making device according to claim 9, further comprising a light indicator mounted on said lower portion of said main body and connected electrically to said power switch unit and the power source.

13. The tea making device according to claim 9, further comprising a safety switch disposed on one side of said main body and located below said tea brewing unit, said safety switch being connected electrically to said heating device and said power switch unit, said pitcher being formed with a protruding lip that is capable of activating said safety switch when said pitcher is in a position for receiving the brewed tea released from said brewing chamber.

14. The tea making device according to claim 1, wherein said tea brewing unit is provided with an upright hollow tube having a top end that is lower than a topmost level of said brewing chamber, and a bottom end, said tea outlet being formed in said bottom end of said hollow tube.

15. The tea making device according to claim 1, wherein said tea brewing unit is disposed at one side of said water receiving chamber of said main body, said main body and said tea brewing unit having a combined size smaller than said space of said pitcher.

16. The tea making device according to claim 1, wherein said pitcher has an outer surface provided with a vertically extending tongue member, said tea making device being further provided with a handle member that has a rear side formed with a vertical dovetail groove which engages said tongue member so as to mount said handle member on said pitcher.

17. The tea making device according to claim 16, wherein said tongue member of said pitcher has a top end portion provided with a horizontal extension that is formed with a through hole, said handle member having a top end portion formed with a mounting hole aligned with said through hole for receiving a screw fastener to fasten said handle member onto said tongue member.

* * * * *